(12) United States Patent
Dell'Agli

(10) Patent No.: US 12,163,528 B2
(45) Date of Patent: Dec. 10, 2024

(54) FLANGE AND SEALING COLLAR ASSEMBLY

(71) Applicant: Miguel Dell'Agli, São João da Boa Vista (BR)

(72) Inventor: Miguel Dell'Agli, São João da Boa Vista (BR)

(*) Notice: Subject to any disclaimer, the term of this patent is extended or adjusted under 35 U.S.C. 154(b) by 0 days.

(21) Appl. No.: 18/279,331

(22) PCT Filed: Apr. 30, 2021

(86) PCT No.: PCT/BR2021/050181
§ 371 (c)(1),
(2) Date: Oct. 2, 2023

(87) PCT Pub. No.: WO2022/183260
PCT Pub. Date: Sep. 9, 2022

(65) Prior Publication Data
US 2024/0200565 A1    Jun. 20, 2024

(30) Foreign Application Priority Data

Mar. 2, 2021 (BR) .......................... 1020210039337

(51) Int. Cl.
*F04D 29/08* (2006.01)
*F01D 25/18* (2006.01)
(Continued)

(52) U.S. Cl.
CPC ......... *F04D 29/083* (2013.01); *F01D 25/183* (2013.01); *F04D 17/10* (2013.01); *F16J 15/3464* (2013.01)

(58) Field of Classification Search
CPC .... F16J 15/3464; F01D 25/183; F04D 29/083
See application file for complete search history.

(56) References Cited

U.S. PATENT DOCUMENTS 4,986,733 A * 1/1991 Fleury ................... F04D 29/266
                                                               415/230
8,545,106 B2  10/2013 Miller et al.
(Continued)

FOREIGN PATENT DOCUMENTS

BR            PI1102108 A2    3/2014
BR        202014005712 U2   12/2015
(Continued)

OTHER PUBLICATIONS

PCT International Search Report for International Application No. PCT/BR2021/050181, mailed Dec. 2, 2021, 7pp.
(Continued)

*Primary Examiner* — Eugene G Byrd
*Assistant Examiner* — L. Susmitha Koneru
(74) *Attorney, Agent, or Firm* — The Roy Gross Law Firm, LLC; Roy Gross

(57) ABSTRACT

A FLANGE AND SEALING COLLAR ASSEMBLY which comprises a flange and a sealing collar, the sealing collar being mounted inside the flange, where the sealing collar has a front portion with a smaller diameter than the rear portion, two rings piston in the anterior portion and the flange has a communication channel that interconnects the middle portion between the piston rings of the sealing collar with the exhaust manifold coupled to the turbocharged system, obtaining the advantage of through the positive pressure coming from the exhaust manifold prevent the return of lubricating oil to the compressor of the turbocharged system.

8 Claims, 5 Drawing Sheets

(51) Int. Cl.
*F04D 17/10* (2006.01)
*F16J 15/34* (2006.01)

(56) References Cited

U.S. PATENT DOCUMENTS

2008/0066444 A1* 3/2008 Cornelius ................. F02C 7/04
                                                               60/39.181
2014/0140865 A1* 5/2014 Uneura ............... F16C 33/1045
                                                                 417/365

FOREIGN PATENT DOCUMENTS

| BR | 102018076950 A2 | 7/2020 |
| CN | 205859420 U | 1/2017 |
| CN | 109488823 A | 3/2019 |
| CN | 208750218 U | 4/2019 |
| DE | 19507736 B4 | 5/2008 |

OTHER PUBLICATIONS

PCT Written Opinion for International Application No. PCT/BR2021/050181, completed Nov. 24, 2021, 10pp.

* cited by examiner

FLANGE AND SEALING COLLAR ASSEMBLY

CROSS REFERENCE TO RELATED APPLICATIONS

This application is a National Phase of PCT Patent Application No. PCT/BR2021/050181 having International filing date of Apr. 30, 2021, which claims the benefit of priority of Brazilian Patent Application No. 1020210039337, filed Mar. 2, 2021, the contents of which are all incorporated herein by reference in their entirety.

FIELD OF THE APPLICATION

The present invention comprises a device contained in the field of application of machines or engines, more precisely the parts and/or details of such equipment, referring to a sealing set in equipment containing a large flow of oil.

The present invention comprises a flange and sealing collar assembly, which is applied in high pressure systems containing oil demand for lubrication, having the function of inhibiting the passage of oil to the air flow.

BACKGROUND OF THE INVENTION

As professionals involved in the combustion engine industry and other related elements are aware, the market has several models of turbo compressors. Most of them, despite their good functionality and performance, have a number of components that bring difficulties with regard to their respective maintenance, as well as with regard to the high costs of manufacturing and labor of their parts and components.

One of the recurring problems in mechanical equipment exposed to high pressure, such as turbines, is related to their lubrication. For the correct functioning of these equipment, a constant oil flow is necessary in their moving parts, which guarantees a friction tendency between such parts very close to zero. However, as they are exposed to high pressure, this type of equipment may present operating conditions that allow oil leakage and possible contamination of the air flow, impairing important processes, such as the intake air of an engine.

In this way, mechanical equipment subject to high pressure and with constant lubrication demand require consistent sealing systems safeguarding and protecting their most sensitive parts, avoiding severe damage to such equipment.

A solution already presented for some of the aforementioned difficulties is found in patent PI1102108-0, which was filed on May 31, 2011 entitled "APERFEIÇOAMENTOS INTRODUZIDOS EM SISTEMA DE MANCAIS E VEDAÇÃO EM TURBO ALIMENTADOR PARA MOTORES A EXPLOSÃO" [IMPROVEMENTS INTRODUCED IN BEARING AND SEALING SYSTEM IN TURBOCHARGER FOR COMBUSTION ENGINES]. The document deals particularly with a bearing and sealing system applied to a turbocharger, essentially consisting of a double fixed radial bearing with incorporated abutment bearing, featuring an annular mono-block structure and lubrication channels, an axial abutment flange with chamber and double sealing, a double-sealed collar and bearing abutment, and this assembly incorporates combustion engines, promoting a substantial reduction of component elements and also of machining costs for its execution, further minimizing the difficulty of assembly and maintenance usual in a turbo compressor, increasing engine performance due to the reduction of friction between the component parts of the assembly, in addition to facilitating compaction by reducing the dimensions of the central assembly and also providing greater freedom in choosing its materials, all these innovative elements provide improvements in its use and full efficiency within the purpose for which they are intended.

A new evolution within the present field of application is found in the patent BR202014005712-4, which was filed on Jun. 26, 2014 entitled "DISPOSITIVO DE VEDAÇÃO DE ÓLEO PARA TURBO ALIMENTADORES" [OIL SEALING DEVICE FOR TURBOCHARGERS]. The document deals with a set of elements for sealing oil used in turbochargers, which is composed of a collar and a flange, and the innovation disclosed is the alteration of the usual format of these two elements, part of this sealing assembly, thus promoting the optimization of the performance of this turbocharger and greater efficiency of these elements that are made each in a single piece and have a generally cylindrical shape, corresponding to each other, providing in their side walls, a plurality of annular recesses contouring and parallel to each other, these recesses forming cradles of the sealing rings, performing the sealing effectively.

Another evolution within the same technical field is found in document BR102018076950-2, which is a direct evolution of document BR202014005712-4, which presents an oil sealing system, applied to equipment under high pressure, comprising a flange equipped with of a sealing collar inside, and the flange has oil sealing rings and the sealing collar has piston rings, where the flange contains a communication channel between its inner portion, where the sealing collar is located, and the external environment of the turbine, producing a pressure compensation effect, preventing the negative pressure generated from sucking the intake lubricating oil.

However, the solution presented in document BR102018076950-2, under certain working conditions, allowed the lubrication oil to escape through the communication channel from the interior portion to the external environment. Therefore, such a solution was not satisfactory for all relevant working conditions in high-pressure turbochargers.

Thus, it is indisputable that the state of the art would benefit from the introduction of an efficient sealing system both for normal operating conditions of high-pressure equipment, as well as under atypical but usual operating conditions, solving the problem of leakage of oil into the intake air flow or other parts that may cause damage to the equipment, or even preventing such lubrication oil from being expelled into the internal portion of the device.

OBJECTIVES OF THE INVENTION

The present invention aims to present an oil sealing system applied in high-pressure equipment, which works effectively both in normal and in atypical operating conditions, but usual circumstances.

Another objective of the present invention is to present an oil sealing system based on the positive pressure coming from the exhaust manifold coupled to the turbocharging system.

BRIEF DESCRIPTION OF THE INVENTION

The present invention discloses an oil sealing system applied to high-pressure equipment comprising a flange equipped with a sealing collar inside, the flange having oil sealing rings and the sealing collar having piston rings.

The invention also discloses a flange containing a communication channel between its inner portion, where the sealing collar is located and the exhaust manifold coupled to the turbocharging system, producing a positive pressure effect, thus preventing the lubricating oil from returning to the interior of the turbocharger compressor.

The invention also discloses a sealing collar equipped with at least two piston rings, and between the first and second rings there is on the flange an entrance coinciding with the communication channel, generating a limit point for the vacuum.

BRIEF DESCRIPTION OF THE DRAWINGS

The subject matter of this invention will be completely clear in its technical aspects from the detailed description that will be made based on the figures listed below, wherein.

DETAILED DESCRIPTION OF THE INVENTION

Figure 1:
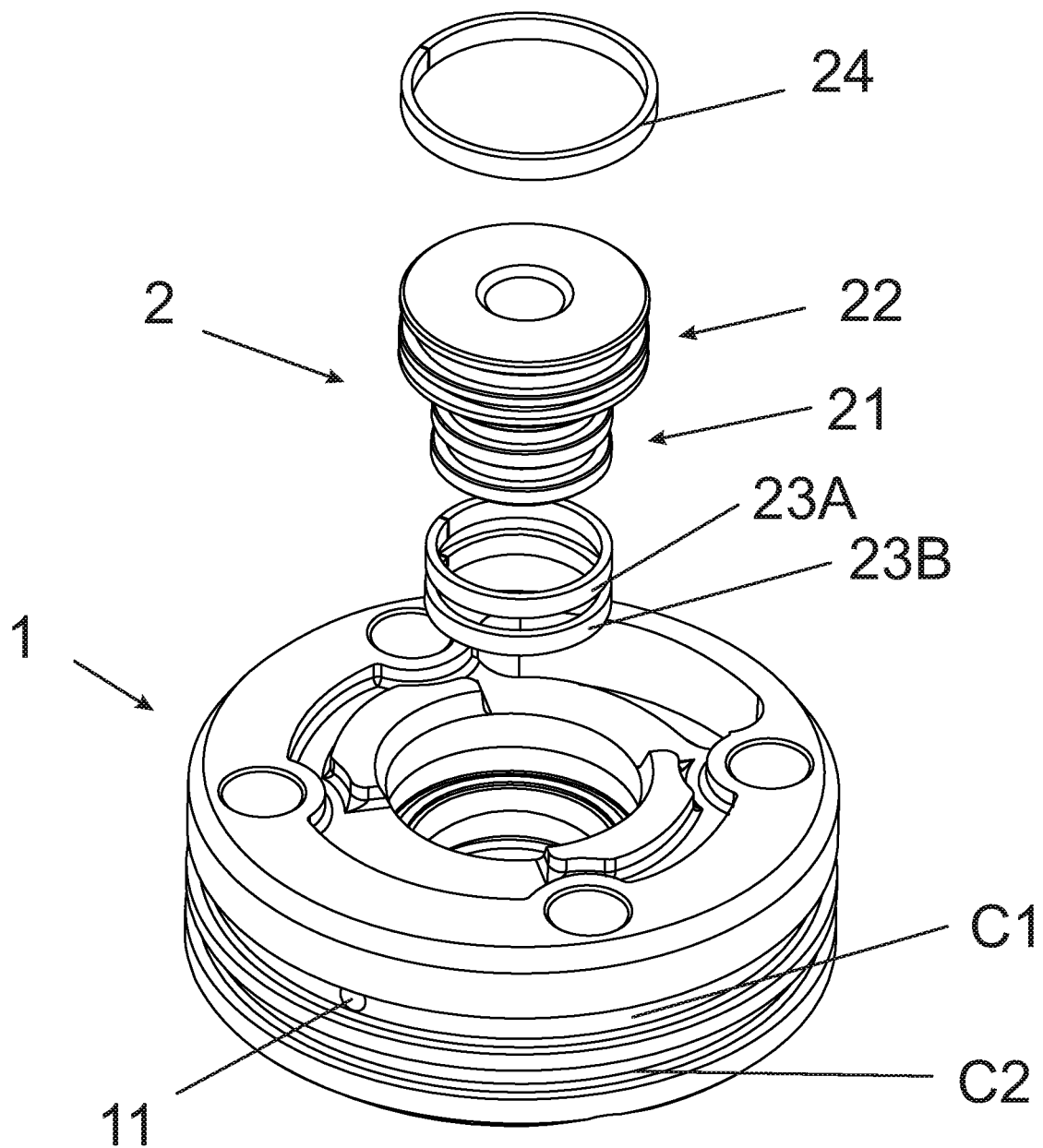
FIG. 1 shows an exploded perspective view of the flange and sealing collar assembly.
Figure 2:
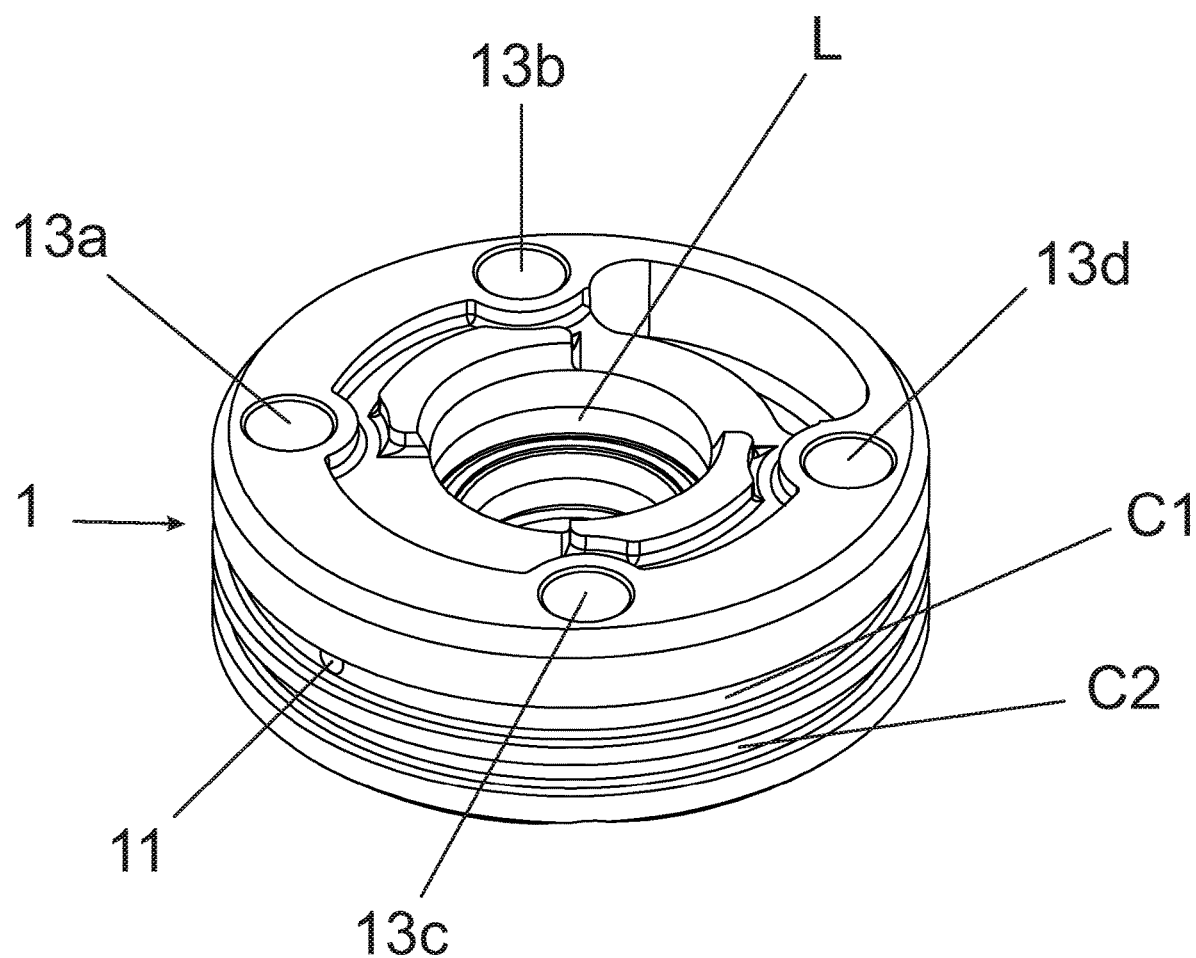
FIG. 2 shows a perspective view of the flange.
Figure 3:
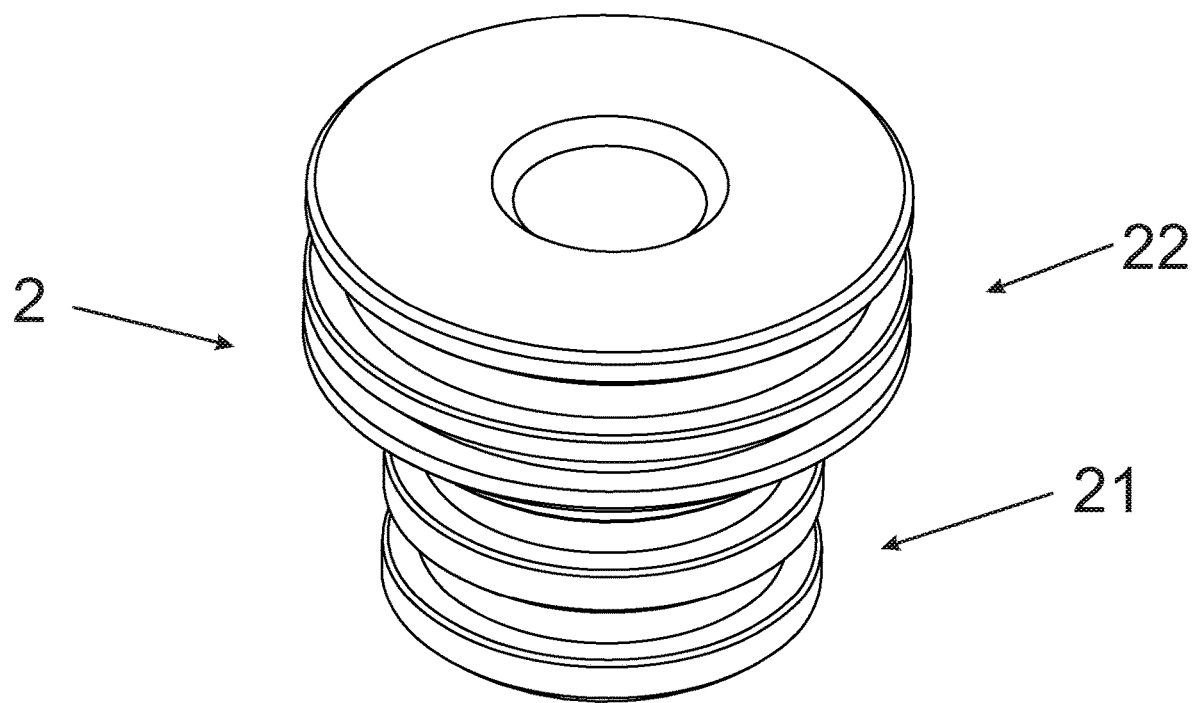
FIG. 3 shows a perspective view of the sealing collar.
Figure 4:
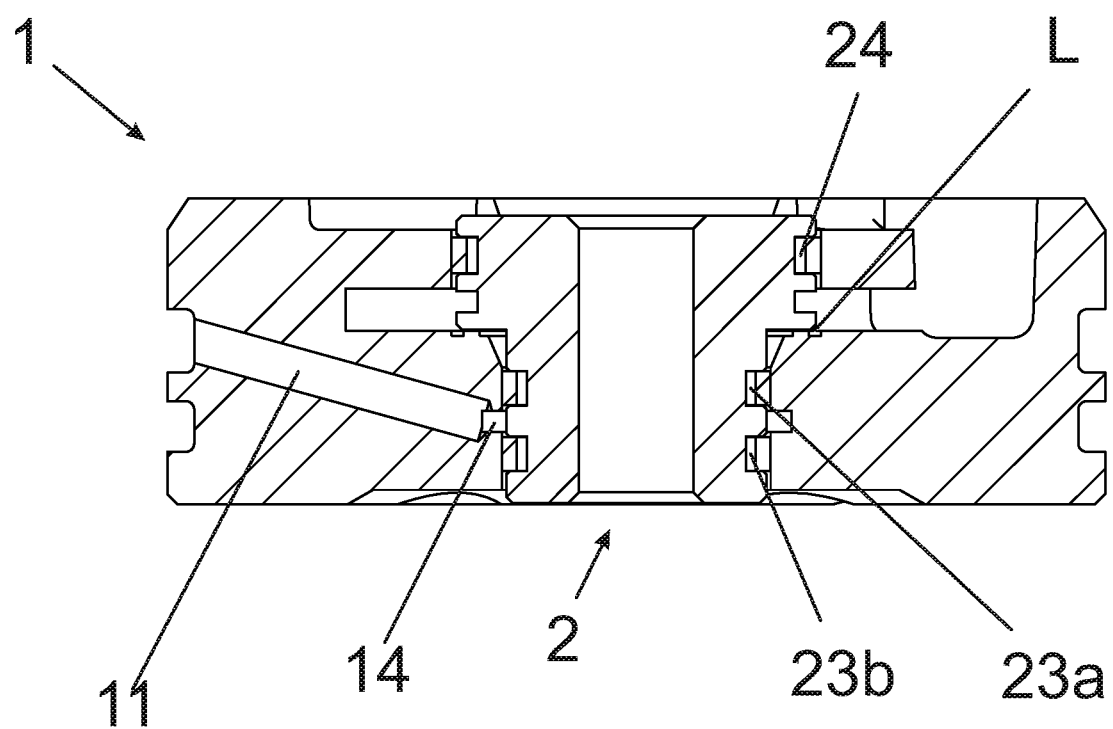
FIG. 4 shows a cross-section front view of the flange and sealing collar assembly.
Figure 5:
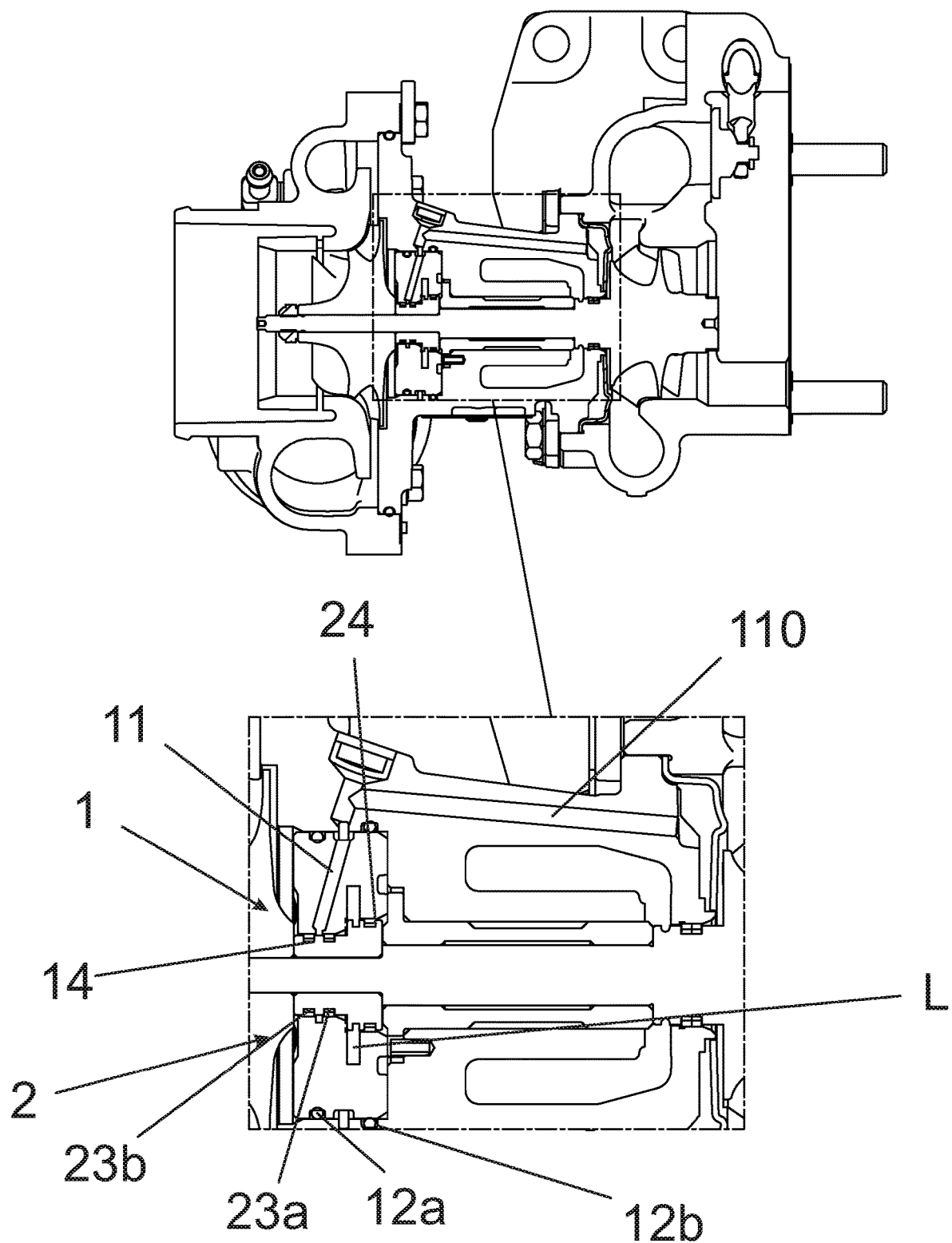
FIG. 5 shows a cross-section rear view of the flange and sealing collar assembly applied to a turbine and a detail of that assembly, showing the communication channel with the external portion of the turbine.

In accordance with the objectives presented through the brief description, the present patent application "FLANGE AND SEALING COLLAR ASSEMBLY" discloses an assembly formed by a flange (1) and a sealing collar (2), the said sealing collar (2) mounted inside the flange (1).

The flange (1) has a substantially cylindrical shape, wherein its outer portion has two cavities (C), a first cavity (C1) and a second cavity (C2); the cavities (C) being extend across the entire outer periphery of said flange (1) and are equidistantly spaced. The O-ring type oil sealing rings are mounted in both the first cavity (C1) and in the second cavity (C2).

Said flange (1) also has an internal labyrinth (L) which corresponds to successive recesses interconnected with each other at different depths, which go along the sinuosity of the flange (1). And such internal labyrinth (L) has the function of preventing oil from entering its internal portion.

The flange (1) has a central opening inside, in a circular shape, wherein the sealing collar (2) fits, and said sealing collar (2) can rotate inside the flange (1), and the labyrinth (L) has the function of preventing oil flow between the flange (1) and the sealing collar (2).

The flange (1) also has a communication channel (11) connecting its internal portion to the exhaust manifold coupled close to the turbocharged system, more precisely through the first cavity (C1), and in its upper external portion a tubular interconnected channel (110), by which the positive pressure exerted through the exhaust manifold prevents the return of lubricating oil to the interior of the compressor of the turbocharged system.

In turn, the sealing collar (2) has a substantially cylindrical shape provided with a front portion (21) and a rear portion (22), the front portion (21) having a smaller diameter compared to the rear portion (22), wherein said front portion (21) has two diametric recesses equidistantly and uniformly distributed in it, which receive two piston rings (23a and 23b), and the rear portion (22) has an anterior diametral recess connecting to the labyrinth (L) and another diametral recess in which an oil sealing ring is allocated.

Once the sealing collar (2) is mounted inside the flange (1), the piston rings (23a and 23b) performed the sealing function regarding the oil circulating inside the flange (1) preventing it from contaminates the intake air. In this new configuration, the system does not need the oil filter previously used in the object of document BR102018076950-2, thus making its embodiment simpler and more economically viable.

In this way, the great technical advantage of the present assembly is to present a solution that in addition to the double sealing performed by the piston rings (23a and 23b) has, through the communication channel (11) and the interconnected channel 110, a means to prevent the return of lubricating oil from inside the turbine to the compressor of the turbocharged system or even to the outside of the turbine, through the positive pressure of the exhaust manifold, in all working conditions commonly performed and even in exceptional working conditions.

It should be understood that the present description does not limit application to the details described herein and that the invention is capable of other embodiments and of being practiced or performed in a variety of ways within the scope of the claims. Although specific terms have been used, such terms are to be interpreted in a generic and descriptive sense, and not for the purpose of limitation.

The invention claimed is:

1. A FLANGE AND SEALING COLLAR ASSEMBLY applied to equipment operating under pressure, equipped with a continuous flow of lubricating oil, characterized in that it comprises a flange (1) and a sealing collar (2), the flange (1) having a substantially cylindrical shape, where in its outer portion it has two cavities (C), a first cavity (C1) and a second cavity (C2), and the cavities (C) extend throughout the outer periphery of said flange (1) and are spaced equidistantly and a communication channel (11), which interconnects the internal portion thereof to the external portion of the equipment through the first central cavity (C1); and an interconnected channel (110), which in turn connects the communication channel (11) and the exhaust manifold coupled to the turbocharged system, exerting positive pressure in the first central cavity (C1) and preventing the lubricating oil from returning to the compressor of the turbocharged system; further having a sealing collar (2) having a substantially cylindrical shape, provided with a front portion (21) and a rear portion (22), the front portion (21) having a smaller diameter compared to the rear portion (22), wherein said front portion (21) has two diametric recesses, equidistantly and uniformly distributed in it, which receive two piston rings (23a and 23b) and the rear portion (22) has an anterior diametral recess and a another diametral recess.

2. THE FLANGE AND SEALING COLLAR ASSEMBLY, according to claim 1, characterized in that the flange (1) has an internal labyrinth (L), corresponding to successive recesses interconnected with each other at different depths, which go along the sinuosity of the flange (1).

3. THE FLANGE AND SEALING COLLAR ASSEMBLY, according to claim 1, characterized in that the flange (1) has a central opening inside, in a circular shape, wherein the sealing collar (2) fits.

4. THE FLANGE AND SEALING COLLAR ASSEMBLY, according to claim 3, characterized in that the sealing collar (2) rotates inside the flange (1).

5. THE FLANGE AND SEALING COLLAR ASSEMBLY, according to claim 1, characterized in that the oil sealing rings are mounted in the first cavity (C1) and in the second cavity (C2) of the flange (1).

6. THE FLANGE AND SEALING COLLAR ASSEMBLY, according to claim 1, characterized in that the anterior diametric recess of the sealing collar (2) connects to the labyrinth (L) of the flange (1).

7. THE FLANGE AND SEALING COLLAR ASSEMBLY, according to claim 1, characterized in that an oil sealing ring is allocated in the other diametric recess of the sealing collar (2).

8. A USE OF A FLANGE AND SEALING COLLAR ASSEMBLY, characterized in that the flange (1) and sealing collar (2) assembly is mounted on an automotive turbine.

* * * * *